(12) United States Patent
Godet et al.

(10) Patent No.: US 11,186,904 B2
(45) Date of Patent: Nov. 30, 2021

(54) METHOD FOR MANUFACTURING TI ALLOYS WITH ENHANCED STRENGTH-DUCTILITY BALANCE

(71) Applicant: Université Libre de Bruxelles, Brussels (BE)

(72) Inventors: Stéphane Godet, Gembloux (BE); Charlotte De Formanoir De La Cazerie, Ixelles (BE)

(73) Assignee: UNIVERSITÉ LIBRE DE BRUXELLES, Brussels (BE)

( * ) Notice: Subject to any disclaimer, the term of this patent is extended or adjusted under 35 U.S.C. 154(b) by 167 days.

(21) Appl. No.: 16/098,777

(22) PCT Filed: May 4, 2017

(86) PCT No.: PCT/EP2017/060630
§ 371 (c)(1),
(2) Date: Nov. 2, 2018

(87) PCT Pub. No.: WO2017/191246
PCT Pub. Date: Nov. 9, 2017

(65) Prior Publication Data
US 2019/0127834 A1 May 2, 2019

(30) Foreign Application Priority Data
May 4, 2016 (EP) .................................... 16168350

(51) Int. Cl.
| C22F 1/18 | (2006.01) |
| C22C 14/00 | (2006.01) |
| B33Y 70/00 | (2020.01) |
| B33Y 80/00 | (2015.01) |
| C22F 1/00 | (2006.01) |

(52) U.S. Cl.
CPC .............. C22F 1/183 (2013.01); B33Y 70/00 (2014.12); B33Y 80/00 (2014.12); C22C 14/00 (2013.01); C22F 1/002 (2013.01)

(58) Field of Classification Search
CPC .......... C22C 14/00; C22F 1/183; C22F 1/002; B33Y 70/00; B33Y 80/00
See application file for complete search history.

(56) References Cited

U.S. PATENT DOCUMENTS

2007/0251614 A1* 11/2007 Bhambri .................. C22F 1/18
148/669
2008/0283162 A1 11/2008 Chiang

OTHER PUBLICATIONS

Qazi, J. I., et al. "Kinetics of martensite decomposition in Ti—6Al—4V—xH alloys." Materials Science and Engineering: A 359.1-2 (2003): 137-149.*
Irving, P. E., and C. J. Beevers. "The effect of air and vacuum environments on fatigue crack growth rates in Ti—6Al—4V." Metallurgical Transactions 5.2 (1974): 391-398.*
Imam, M. A., and C. M. Gilmore. "Fatigue and microstructural properties of quenched Ti—6Al—4V." Metallurgical Transactions A 14.1 (1983): 233-240.*
Yang, Fei, et al. "Preparation of titanium alloy rods by powder compact extrusion." Advanced Materials Research. vol. 1019. Trans Tech Publications Ltd, 2014.*
Al-Bermani et al.: "The Origin of Microstructural Diversity, Texture, and Mechanical Properties in Electron Beam Melted Ti—6A1—4V," Metallurgical and Materials Transactions A, vol. 41A, 3422-3434 (Dec. 2010).
Boyer et al.: "Materials Properties Handbook: Titanium Alloys", 1994, ASM International, USA, ISBN: 0-87170-481-1, XP002216205.
Rafi et al.: "Microstructures and Mechanical Properties of Ti6Al4V Parts Fabricated by Selective Laser Melting and Electron Beam Melting," Journal of Materials Engineering and Performance, vol. 22(12), 3872-3883 (Dec. 2013).
Thijs et al.: "A study of the microstructural evolution durin gselective laser meltin gof Ti—6Al—4V," Acta Materialia, vol. 58, 3303-3312 (2010).
Lütjering and Williams (2007). Titanium. Engineering Materials and Processes. Springer Berlin Heidelberg (2nd Ed.) DOI 10.1007/978-3-540-73036-1.
Leyens, C & Peters, Manfred. (2003). Titanium and Titanium Alloys: Fundamentals and Applications. Wiley-VCH. DOI 10.1002/3527602119.
Vrancken et al.: "Heat treatment of Ti6A14V produced by Selective Laser Melting: Microstructure and mechanical properties," Journal of Alloys and Compounds, vol. 541, 177-185 (2012).
International Search Report and Written Opinion from International Application No. PCT/EP2017/060630, dated Jul. 10, 2017.

* cited by examiner

Primary Examiner — Jessee R Roe
(74) Attorney, Agent, or Firm — Merchant & Gould P.C.

(57) ABSTRACT

A method for manufacturing an $\alpha+\beta$ Ti-6Al-4V alloy includes providing a near-net shape part made of an $\alpha+\beta$ Ti-6Al-4V alloy. The part is heat treated in the $\alpha+\beta$ field between 875 and 920° C. The heat treated part is water quenched to transform the $\beta$ phase into $\alpha'$ martensite. There is no further heat treatment after the quenching step.

16 Claims, 5 Drawing Sheets

METHOD FOR MANUFACTURING TI ALLOYS WITH ENHANCED STRENGTH-DUCTILITY BALANCE

This application is a National Stage Application of PCT/EP2017/060630, filed 4 May 2017, which claims benefit of Serial No. 16168350.3, filed 4 May 2016 in Europe and which applications are incorporated herein by reference. To the extent appropriate, a claim of priority is made to each of the above disclosed applications.

FIELD OF THE INVENTION

The invention relates to an $\alpha+\beta$ titanium alloy and, more particularly, to a method for manufacturing an $\alpha+\beta$ titanium alloy with a high strength, ductility and work hardening ability.

BACKGROUND OF THE INVENTION

Ti-6Al-4V (TA6V) is an $\alpha+\beta$ titanium alloy whose high strength-to-density ratio and biocompatibility make it an excellent candidate for both aeronautic and biomedical applications. In wrought Ti-6Al-4V, equiaxed or bi-modal microstructures are preferred, for their good ductility and fatigue strength (C. Leyens, M. Peters, *Titanium and Titanium Alloys, Fundamentals and Applications,* Wiley-VCH, 2003). However, very low hardening rates and associated reduced uniform elongation are usually observed. Such microstructures are obtained through complex multistep thermomechanical schedules during which the totality or a fraction of the acicular $\alpha$ is globularized through hot deformation in the $\alpha+\beta$ field (G. Lütjering, J. C. Williams, in, Springer, 2007).

Additive manufacturing (AM) offers the opportunity to produce parts with complex geometries. The as-built microstructures obtained after AM substantially differ from those observed in wrought titanium. Ti-6Al-4V produced by Selective Laser Melting (SLM) or Electron Beam Melting (EBM) exhibits a columnar morphology caused by the homoepitaxial growth of the parent $\beta$ grains during solidification of the melt pool (S. S. Al-Bermani, M. L. Blackmore, W. Zhang, I. Todd, *Metall and Mat Trans A,* 41 (2010) 3422-3434). The microstructure resulting from the $\beta$ to $\alpha$ phase transformation is lamellar. In the case of SLM, the presence of acicular martensite $\alpha'$ is systematically reported (L. Thijs, F. Verhaeghe, T. Craeghs, J. V. Humbeeck, J.-P. Kruth, *Acta Materialia,* 58 (2010) 3303-3312), as a result of the fast cooling rate. This fully martensitic microstructure is detrimental to the ductility. In EBM, however, a fine $\alpha+\beta$ basket-weave microstructure is observed, with a grain boundary $\alpha_{GB}$ layer along the prior $\beta$ grains (S. S. Al-Bermani, M. L. Blackmore, W. Zhang, I. Todd, *Metall and Mat Trans A,* 41 (2010) 3422-3434). The resulting ductility of EBM parts, although higher than that of SLM parts, remains lower than that obtained in the conventional wrought material (H. K. Rafi, N. V. Karthik, H. Gong, T. Starr, B. Stucker, *Journal of Materials Engineering and Performance,* 22 (2013) 3872-3883).

In order to optimize the microstructure of near-net shape parts obtained by AM, hot deformation cannot be considered. Therefore, innovative heat treatments should be developed specifically for AM so as to improve the mechanical properties of additively manufactured parts without altering their geometry.

In this respect, the document of Vrancken Bey et al (*Journal of Alloys and Compounds,* 541 (2012) 177-185) discloses a heat treatment of Ti6Al4V alloys produced by Selective Laser Melting. In one example, the specimen is heat treated at 850° C. during 2 hours and then water quenched. This document is silent on the resulting mechanical properties.

The data sheet of Boyer et al (*Materials Properties Handbook: Titanium Alloys, XX, XX,* (1994 Jan. 1), 695, 699-700) on an alpha-beta titanium alloy IMI 550 discloses a heat treatment at 900° C. followed by an air cooling. The heat treated sample has a yield strength at 0.2% of 930 MPa and a tensile strength at 1080 MPa. This sample has a poor work hardening ability with a yield ratio (YS/TS) of 0.86.

The document US 2008/0283162 discloses a method for manufacturing a high-strength titanium alloy golf club head part. The golf club head part is heated to a temperature higher than a critical temperature of generating martensite, then cooled to a temperature below the critical temperature at a cooling rate higher than 10° C./s to form martensite and then heated to a temperature higher than 450° C. and maintained at that temperature at least one hour to eliminate the residual stress and to enhance the plasticity. The resulting products have a poor work hardening ability with a yield ratio higher than 0.9

AIMS OF THE INVENTION

Compared to the heat treatments of the prior art, the present invention aims to provide innovative heat treatments for manufacturing near-net shape parts made up of Ti alloys combining high strength, high ductility and high work hardening ability.

BRIEF DESCRIPTION OF THE DRAWINGS

The features and advantages of the present invention will become apparent by reading the following detailed description with reference to the attached drawings which illustrate the following.

For samples manufactured by EBM, HIP'ed and heat treated.

SUMMARY OF THE INVENTION

Figure 1:
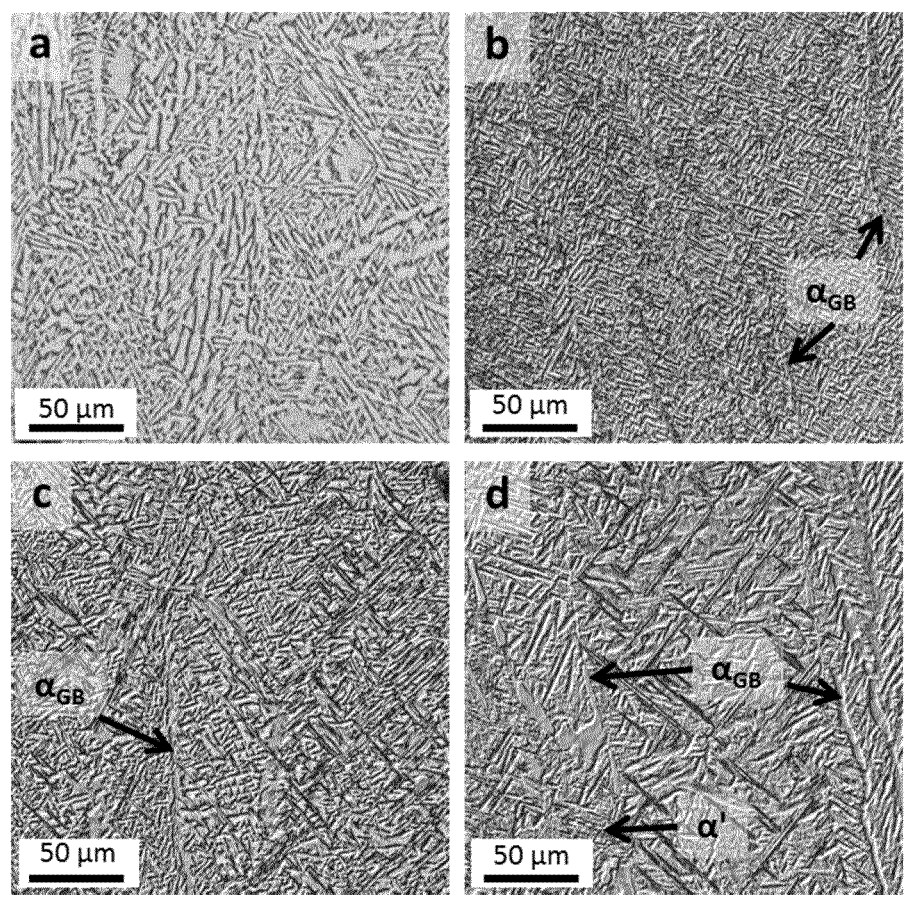
FIG. 1 represents the microstructures of tensile specimens manufactured by EBM and HIP'ed followed by a) no heat treatment, as HIP'ed, b) 2 h at 900° C.—water quenched, c) 2 h at 920° C.—water quenched, d) 2 h at 980° C.—water quenched. $\alpha_{GB}$ and $\alpha'$ represent the alpha phase at the grain boundary and the martensite respectively.

The present invention relates to a method for manufacturing an α+β titanium alloy comprising the following steps:

Providing a near-net shape part made of an α+β titanium alloy,

Heat treating said part in the α+β field between 850 and 920° C.,

Quenching said heat treated part to transform the β phase into α' martensite.

According to particular preferred embodiments, the method according to the invention further discloses at least one or a suitable combination of the following features:

the near-net shape part is obtained by additive manufacturing followed by hot isostatic pressing;

the near-net shape part is heat treated in a temperature range between 875 and 920° C.;

the near-net shape part is heat treated in a temperature range between 875 and 910° C.;

the near-net shape part is heat treated at a temperature of around 900° C.;

The present invention also relates to an α+β titanium alloy having a tensile strength×uniform elongation ($R_m*e_u$) balance higher than 9500 MPa % and a yield strength/tensile strength ratio ($R_{0.2}/R_m$) lower than 0.8.

According to particular preferred embodiments, the α+β titanium alloy according to the invention further discloses at least one or a suitable combination of the following features:

the tensile strength×uniform elongation ($R_m*e_u$) balance is higher than 11000 MPa % and preferably higher than 11500 MPa %;

the yield strength/tensile strength ratio ($R_{0.2}/R_m$) is lower than 0.75 and, preferably, lower than 0.72;

the tensile strength is higher than 1000 MPa for an uniform elongation higher than 11%;

it has a microstructure comprising a percentage of martensite ranging from 20 to 50%;

the percentage of martensite in the microstructure is around 40%.

The present invention also relates to a product made of the α+β titanium alloy previously described and to the use of this alloy in a biomedical or aeronautic field.

DETAILED DESCRIPTION OF THE INVENTION

The present invention relates to a method for manufacturing α+β Ti alloys with enhanced strength, ductility and work hardening properties starting from near-net shape parts. According to the invention, the near-net shape parts are preferably made by additive manufacturing but the present invention does not exclude to manufacture near-net shape parts by hot working, casting or powder metallurgy. Additive manufacturing refers to various technologies used to synthesize a three-dimensional object such as the selective laser melting (SLM), the electron beam melting (EBM), etc. As an example, the method will be mainly illustrated below for a near-net shape part obtained by electron beam melting.

According to the invention, the heat treatment after additive manufacturing is specifically designed to provide products with a high tensile strength and a high ductility. By high tensile strength and high ductility are meant a tensile strength superior to 1000 MPa for an uniform elongation superior to 9% and, preferably, superior to 10% to meet the aeronautic requirements. In addition, the final product must have improved hardening capabilities with a yield ratio ($R_{0.2}/R_m$) below 0.8, preferably below 0.75 and most preferably below 0.72. The product with the best properties has a tensile strength-uniform elongation balance higher than 11500 MPa % for a yield ratio lower than 0.72. This particular combination of properties is obtained thanks to the presence of an optimum percentage of martensite in the final microstructure. According to the invention, the aimed percentage of martensite ranges from 20 to 50% with an optimum value close to 40%.

To obtain this microstructure and the resulting properties, the method according to the invention comprises the following steps:

Providing a near-net shape part made of an α+β. Ti alloy. The α+β. Ti alloy is preferably a Ti-6Al-4V alloy but the present method may apply to any Ti alloys with a α+β phase such as Ti-10V-2Fe-3Al, Ti-3Al-2.5V or Ti-7Al—Mo alloys, just to cite a few. As already mentioned, the near-net shape part is preferably made by additive manufacturing but the present invention does not exclude to manufacture the near-net shape part by hot working, casting or powder metallurgy.

Heat treating the near-net shape part in the α+β field in a specific range of temperature to form maximum 50% β phase. The temperature ranges from 850 to 920° C., preferably from 875 to 920° C., and, more preferably from 875 to 910° C. with an optimum close to 900° C. No particular attention is paid to the holding time at the annealing temperature. However, it must be sufficient to get the equilibrium between both phases. A minimum time of 10 minutes is thereby recommended.

Quenching, in particular water quenching, the heat treated part to transform the β phase into martensite, referred to as α'. To obtain a microstructure with martensite, the cooling rate must be at least of 20° C./s. To keep a high work hardening ability, there is no further heat treatment or aging after quenching.

The method according to the invention is illustrated hereafter for a Ti-6Al-4V ELI alloy with the composition of table 1.

TABLE 1

| | Element | | | | | | | |
|---|---|---|---|---|---|---|---|---|
| | Al | V | C | Fe | O | N | H | Y | Ti |
| wt % | 6.47 | 4.12 | 0.01 | 0.22 | 0.08 | 0.01 | 0.001 | <0.001 | Bal. |

The near-net shape parts were manufactured by additive manufacturing (AM) and in particular by electron beam melting. One near-net shape part was also manufactured by hot working (HW). The manufactured parts may have any shape to form prosthesis, blades, etc. but, for the sake of convenience, cylindrical tensile specimens with a diameter of 5.5 mm were prepared. The AM specimens were manufactured by electron beam melting using an Arcam AB® A2 machine, with the standard ARCAM build parameters. In order to remove critical defects from both the bulk and the surface, the specimens were first submitted to Hot Isostatic Pressing (HIP) and surface machining. The HIP process was performed under a temperature of 920° C.±10° C., a pressure of 1000 bar±50 bar and a holding time of 2 hours±30 minutes. The HW specimens were manufactured by forging through multistep thermomechanical schedules in the α+β field. After forging, the specimens were air cooled down to room temperature.

For each sample, a specific heat treatment was subsequently performed. The tensile samples were first placed in a quartz capsule, under a protective argon atmosphere, to avoid oxidation. Each of these heat treatments was performed for 2 h at sub-transus temperatures ranging from 850° C. to 980° C., in order to obtain a range of α/β phase fractions. Fast cooling to ambient temperature was obtained by quenching the specimens in water (after breaking the quartz tube) in order to transform the β phase into α' martensite. A cooling rate of 350° C./s was measured. For each temperature, three specimens were heat treated, water quenched and submitted to tensile tests, at room temperature, up to fracture, with an extensometer and at a cross-head speed of 1 mm/min. In order to characterize the resulting microstructures and to determine the α/α' phase proportion, optical microscopy, XRD and EDX analyses were performed on all specimens.

The corresponding optical micrographs for some AM specimens are reported in FIG. 1. In (a), there is no heat treatment after the HIP process. In b), c) d), the specimens were heated 2 h at 900, 920 and 980° C. respectively and then water quenched. HIP'ed specimens that did not undergo any further post treatment exhibit an α+β lamellar microstructure, which is significantly coarser than that of as-built electron beam melted parts (not represented). This microstructure has also been reported in previous work (S. L. Lu, H. P. Tang, Y. P. Ning, N. Liu, M. Qian, *Metall and Mat Trans A*, (2015) 3824-3834) and can be attributed to the slow cooling applied to the material after HIP. Heat treated specimens, on the other hand, exhibit a distinctive microstructure. Fine α lamellae coexist with much thinner α' laths. The amount of a lamellae in the prior β grain decreases as the annealing temperature increases, whereas larger fractions of acicular α' laths can be observed. In all samples, a coarse layer $\alpha_{GB}$ remains present along the β grain boundaries.

Figure 2:
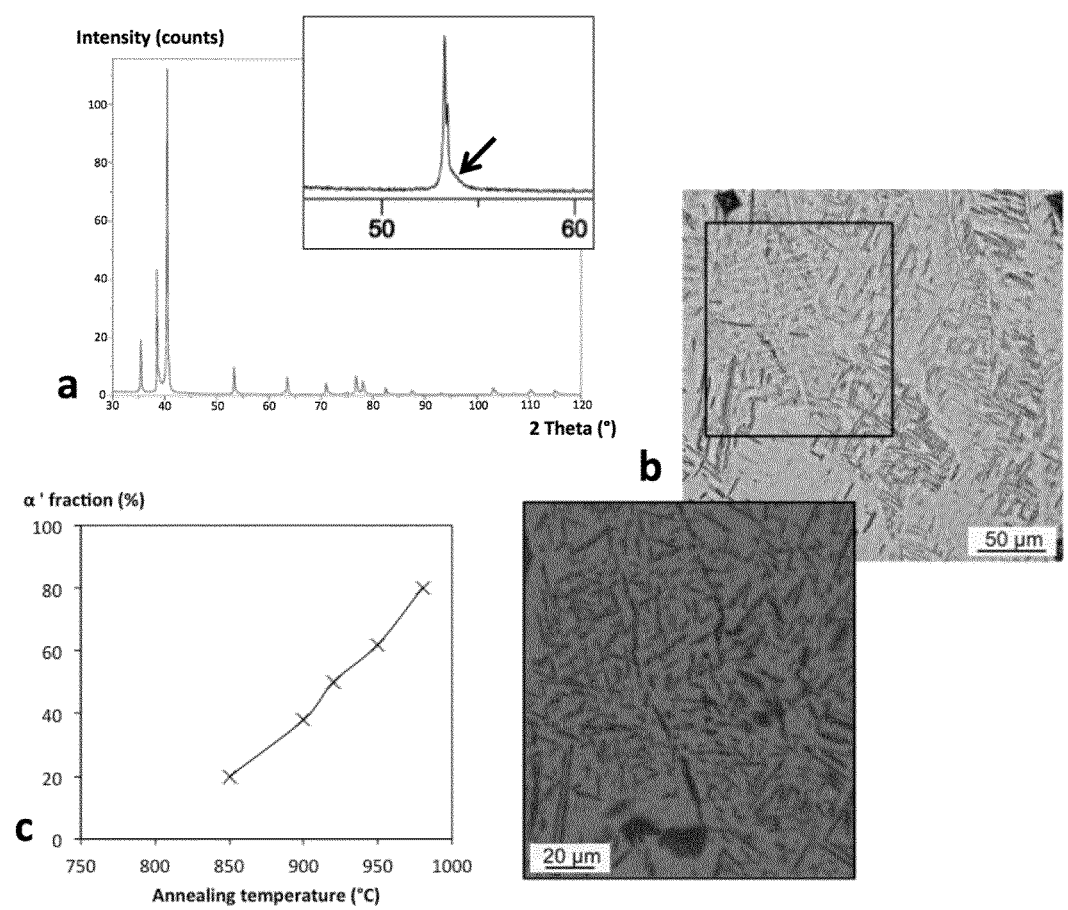
FIG. 2 represents:
(a) a XRD profile of a sample according to the invention heated for 2 h at 920° C.;
(b) a vanadium element map (K-line) obtained by EDX, and an optical micrograph of the corresponding area;
(c) the martensite fraction as a function of the annealing temperature for the samples of the invention, measured by image analysis of the EDX element maps.

The presence of martensite in the microstructure of the heat treated and water quenched samples was confirmed by performing XRD analysis. As highlighted in FIG. 2.*a*., broadening of some peaks can be observed in the XRD profile of the samples. This indicates the presence of a metastable α' phase—exhibiting a distorted lattice—along with the equilibrium a phase.

This dual α+α' microstructure is a direct consequence of fast cooling from the α+β field: quenching of the β phase leads to the formation of martensite. Increasing the annealing temperature results in a higher fraction of β and therefore in larger amounts of martensite at ambient temperature.

The fraction of martensite was measured by performing chemical characterization of the AM samples using EDX element analysis. Image analysis allowed the amount of V-enriched phase (highlighted in light grey in FIG. 2.*b*.) to be precisely quantified. Vanadium, a β stabilizer, is indeed known to partition preferentially to the β phase during the annealing treatment carried out in the α+β temperature range. Consequently, the V concentration will be larger in the α' phase resulting from fast cooling of the β phase.

Figure 3A:
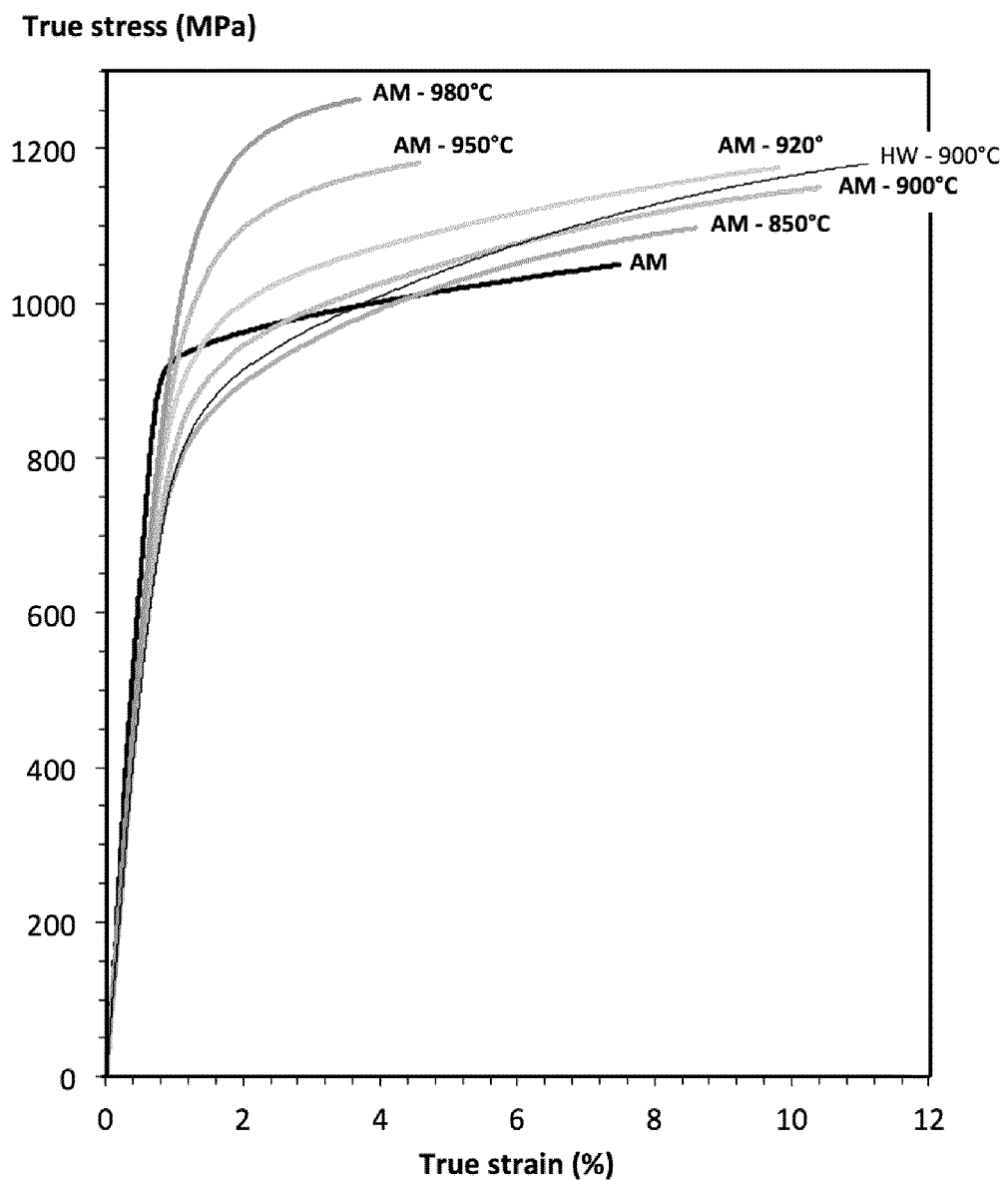
FIGS. 3(a) and 3(b) represent respectively the true stress-true strain curves and the strain hardening exponent $n_{incr}$ as a function of the strain for tensile specimens manufactured by AM, in particular by EBM, HIP'ed and heat treated according to the invention (samples AM −850° C./900° C./920° C./950° C./980° C.). The graphs include a result for a sample manufactured by hot working followed by a heat treatment according to the invention (sample HW −900° C.). There is one comparative sample manufactured by AM, in particular by EBM, and HIP'ed without heat treatment (sample AM).

The typical tensile curves for AM and HW samples are reported in FIG. 3(*a*). Depending on the annealing temperature applied to the specimens, the tensile behavior varies significantly both from a ductility and from a strength perspective. The hardening behavior as described by $$n_{incr} = \frac{d\ln\sigma}{d\ln\varepsilon}$$

is presented in FIG. 3(*b*). In Table 2, the average yield stress ($R_{0.2}$), engineering ultimate tensile stress ($R_m$), maximum true stress ($\sigma_m$) and uniform elongation ($e_u$) are reported for each annealing temperature, along with the corresponding fraction of α' martensite. In order to quantify the total strain to failure, the reduction of area ($A_r$) is also reported. It can be noted that, depending on the annealing temperature, a broad range of mechanical properties is obtained.

TABLE 2

| | α' (%) | $R_{0.2}$ (MPa) | $R_m$ (MPa) | $\sigma_m$ (MPa) | $e_u$ (%) | $A_r$ (%) | $R_{0.2}/R_m$ | $R_m * e_u$ (MPa*%) |
|---|---|---|---|---|---|---|---|---|
| Ti—6Al—4V, annealed* (HW) | 0 | 880 | 950 | / | / | 36 | 0.93 | / |
| AM | 0 | 914 | 971 | 1056 | 8.8 | 38 | 0.94 | 8544 |
| AM - 850° C. - 2 h - WQ | 20 | 688 | 1008 | 1106 | 9.7 | / | 0.68 | 9708 |
| AM - 875° C. - 2 h - WQ | 30 | 711 | 1012 | 1110 | 10.2 | / | 0.7 | 10322 |
| AM - 900° C. - 2 h - WQ | 38 | 745 | 1042 | 1161 | 11.4 | 42 | 0.71 | 11881 |
| HW - 900° C. - 2 h - WQ | / | 706 | 1056 | 1188 | 12.5 | / | 0.67 | 13200 |
| AM - 920° C. - 2 h - WQ | 50 | 825 | 1073 | 1186 | 11.3 | 41 | 0.77 | 12120 |
| AM - 950° C. - 2 h - WQ | 62 | 926 | 1140 | 1210 | 6.2 | 41 | 0.81 | 7068 |
| AM - 980° C. - 2 h - WQ | 80 | 939 | 1192 | 1243 | 4.3 | 28 | 0.79 | 5126 |

*Conventional wrought and annealed Ti alloy from the literature (R. Boyer, G. Welsch, E. W. Collings, *Materials Properties Handbook: titanium alloys*, ASM International, 1994)
AM for near-net shape parts manufactured by additive manufacturing and HW for near-net shape parts manufactured by hot working The as-HIP'ed specimens exhibit a relatively high yield strength but a very low hardening, and a moderate ductility. The uniform strain is indeed lower than the 10% required in the aeronautic industry. All heat treatments performed in this work induce a much higher hardening with a yield ratio lower than 0.81 compared to 0.93 for a conventional wrought and annealed specimen. Annealing temperatures of 920° C., 900° C., 875° C. and 850° C. lead to high ultimate tensile strength as a result of the higher hardening, and to high ductility, with a tensile strength higher than 1000 MPa for an uniform elongation close to or higher than 10%. At 950° C., intermediate properties are obtained: in comparison to the as-HIP'ed specimens, the uniform strain is lower, but the reduction of area is slightly improved. Finally, the specimens treated at 980° C. exhibit the highest yield strength and ultimate tensile strength, but a very low ductility.

Figure 4A:
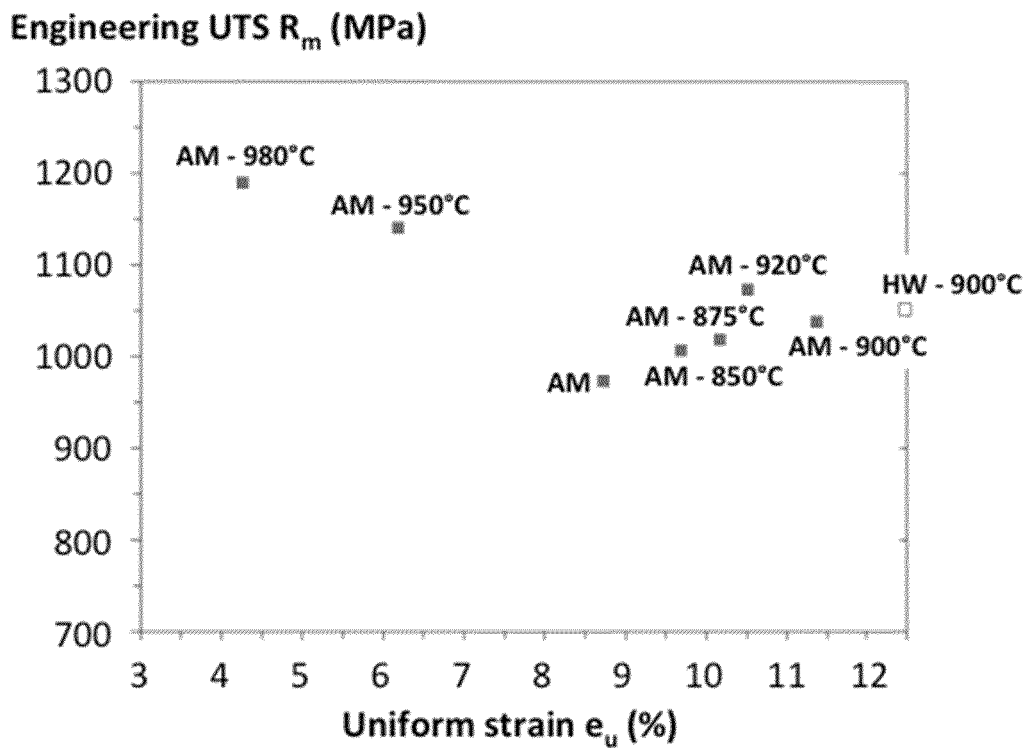
FIGS. 4(a) and 4(b) represent respectively the engineering ultimate tensile stress $R_m$ as a function of the uniform strain and reduction of area for the specimens of the invention. Like in FIG. 3, there is one comparative sample manufactured by AM, in particular by EBM, and HIP'ed without heat treatment (sample AM). In addition, as a reference point (sample HW), a wrought and annealed specimen from the literature is also represented on the graph of FIG. 4(b) (R. Boyer, G. Welsch, E. W. Collings, *Materials Properties Handbook: titanium alloys,* ASM International, 1994).
Figure 4B:
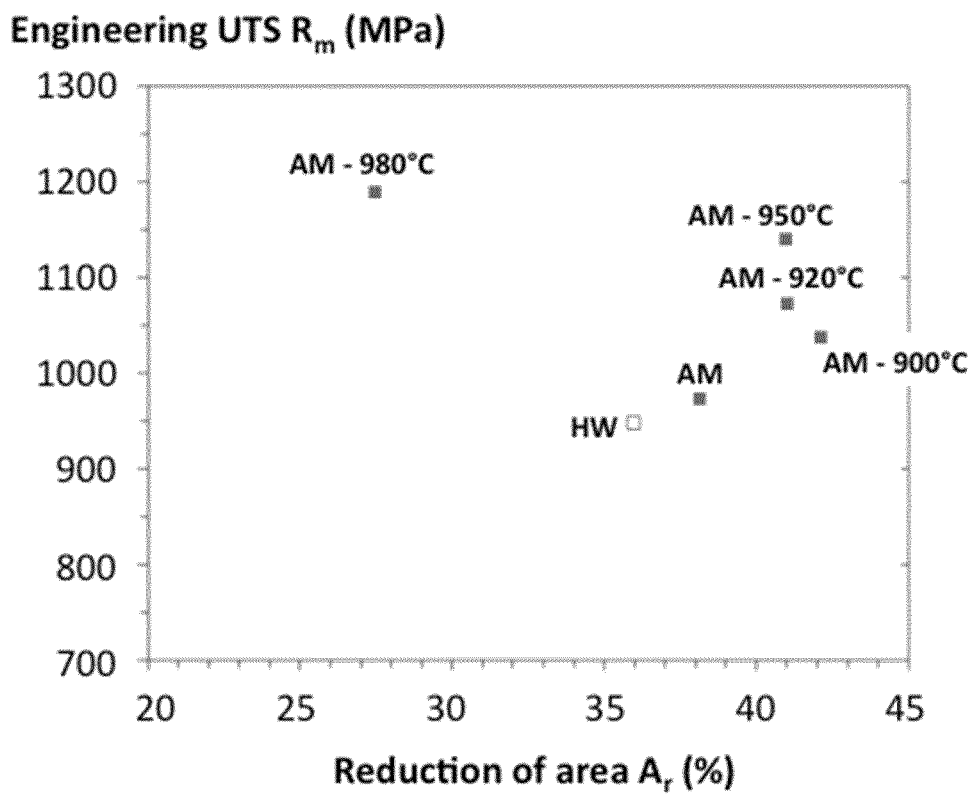

These observations are further illustrated in FIGS. 4(a) and 4(b), which highlight the remarkable improvement in both strength and ductility observed in the specimens treated at a temperature comprised between 850° C. and 920° C., in comparison to the as-built, HIP'ed specimens. As for those treated at 980° C., they exhibit a very high tensile strength which comes along with a lower ductility.

Figure 3B:
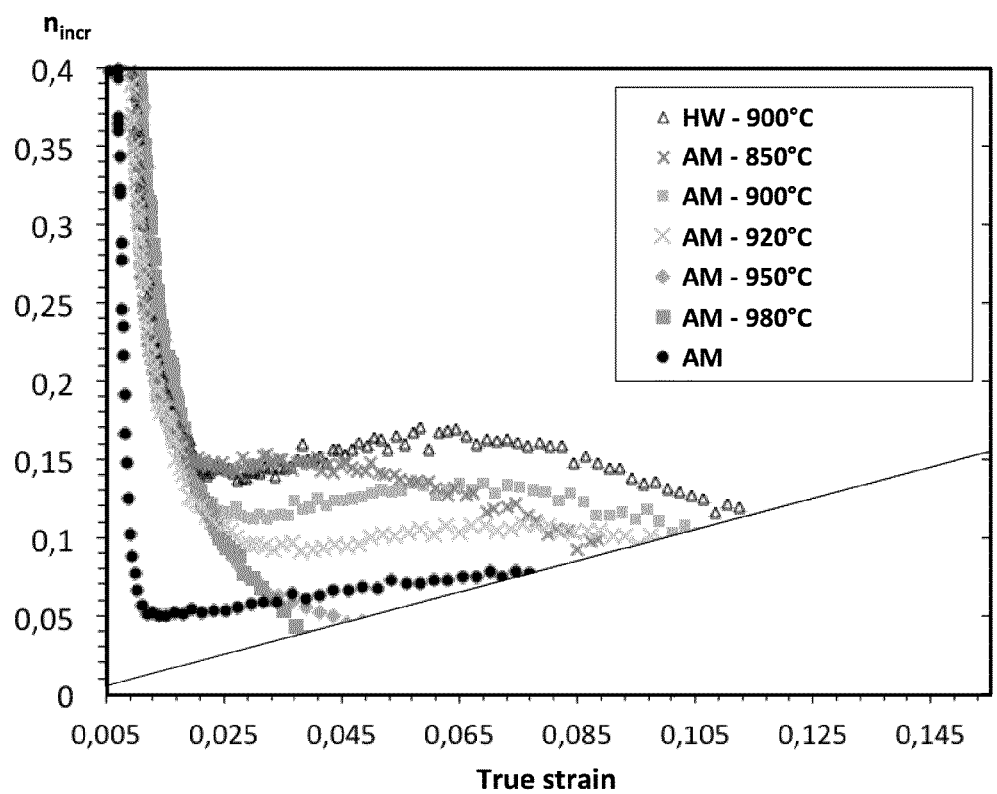

It is interesting to study the work hardening behavior in more detail. FIG. 3(b) reports, for each annealing temperature, the evolution of the work hardening coefficient $n_{incr}$ as a function of strain, i.e. during straining. High annealing temperatures (980° C. and 950° C.) give rise to large strength levels. Even if the $n_{incr}$ is initially higher than in the as-HIP'ed specimen, it decreases steeply so that Considere's criterion for the onset of necking is fulfilled at low strain levels, leading to uniform elongations that are lower than the HIP'ed material. It is also interesting to note that all dual phase microstructures lead to a smooth elasto-plastic transition with an initial hardening rate that is larger than that of the as-built ones. Of even more interest is the hardening behavior of samples annealed and quenched from lower temperatures (i.e. 920° C., 900° C., 850° C.). In that case, the hardening rate is higher than the as-built part over the entire straining range, leading to larger ductilities simultaneously with higher stress levels.

In summary, good properties in terms of tensile strength, ductility and hardening capabilities are obtained for the Ti alloy heat treated between 850 and 920° C. A tensile strength higher than 1000 MPa is obtained for an uniform elongation higher than 9.5%. An uniform elongation higher than 10% is obtained for the specimens heat treated at 875, 900 and 920° C. At 900° C., the tensile strength is greater than 1040 MPa for an uniform elongation of 11.4%. For a heat treatment at 920° C., a higher tensile strength of 1073 MPa is obtained whilst keeping the same uniform elongation. It means that the method according to the invention allows to develop Ti alloys with a tensile strength-uniform elongation balance ($R_m*e_u$) higher than 9500 and even higher than 11500 MPa %, with a maximum of ~12000 MPa % for the AM specimen annealed at 920° C. and with a maximum of ~13000 MPa % for the HW specimen annealed at 900° C. For the range 850-920° C., a yield ratio ($R_{0.2}/R_m$) lower than 0.8 is obtained. The best compromise between ductility, strength and hardening is obtained for an annealing temperature close to 900° C. Indeed, at this temperature, the product ($R_m*e_u$) is around 12000 MPa % for a yield ratio of 0.71 for the AM specimen and is around 13000 MPa % for a yield ratio of 0.67 for the HW specimen. Thereby, based on the above results, the optimum range of annealing temperature is expected to be around 900° C. between 875 and 920° C., and preferably between 875 and 910° C. when a lower yield ratio is required.

The present results show that combining the phases α and α' brings about a considerable improvement of the mechanical behavior of the alloy. Not only is the strength/ductility balance improved, but a desirable strain hardening effect, rarely observed in Ti-6Al-4V, is also introduced.

The hardening rate appears to be directly related to the volume fraction of martensite α' retained in the material. In the range of annealing temperatures investigated here, an optimum was obtained for a volume fraction of 38%, i.e. after performing a treatment at a temperature of 900° C.

It should also be noted that in the samples treated between 850° C. and 920° C., which exhibit less that 50% of martensite, a lower yield strength is observed. This might be a direct consequence of the transformation strain associated to the β→α' martensitic transformation. It might indeed lead to the formation of free dislocations within the α matrix.

In conclusion, the thermal treatments investigated in this work generate outstanding mechanical properties for additively manufactured parts and hot worked parts. A range of mechanical properties can be obtained by playing on the α/α' phase proportion, i.e. on the annealing temperature. Compared to conventional wrought and annealed TA6V, a remarkable improvement of the strength-ductility balance can be achieved.

The invention claimed is:

1. A method for manufacturing an α+β Ti-6Al-4V alloy comprising the following steps:
    providing a near-net shape part made of an α+β Ti-6Al-4V alloy,
    heat treating said part in the α+β field between 875 and 920° C.,
    water quenching said heat treated part to transform the β phase into α' martensite, wherein there is no further heat treatment after the water quenching step,
    wherein the near-net shape part is obtained by additive manufacturing followed by hot isostatic pressing.

2. The method according to claim 1, wherein the near-net shape part is obtained by hot working.

3. The method according to claim 1, wherein the near-net shape part is heat treated in a temperature range between 875° C. and 910° C.

4. The method according to claim 1, wherein the near-net shape part is heat treated at a temperature of about 900° C.

5. An α+β Ti-6Al-4V alloy with a microstructure comprising a percentage of finally quenched martensite ranging from 20 to 50% and having a tensile strength×uniform elongation (Rm*eu) balance higher than 9500 MPa % and a yield strength/tensile strength ratio (R0.2/Rm) lower than 0.8.

6. The α+β Ti-6Al-4V alloy according to claim 5, wherein the tensile strength×uniform elongation (Rm*eu) balance is higher than 10000 MPa %.

7. The α+β Ti-6Al-4V alloy according to claim 5, wherein the yield strength/tensile strength ratio (R0.2/Rm) is lower than or equal to 0.77.

8. The α+β Ti-6Al-4V alloy according to claim 5, wherein the tensile strength is higher than 1000 MPa for an uniform elongation higher than 10%.

9. The α+β Ti-6Al-4V alloy according to claim 5, wherein the microstructure comprises a percentage of martensite ranging from 30 to 50%.

10. The α+β Ti6Al4V alloy according to claim 5, wherein the percentage of martensite in the microstructure is about 40%.

11. A product made of the α+β Ti-6Al-4V alloy according to claim 5.

12. The α+β Ti-6Al-4V alloy according to claim 5, wherein the tensile strength×uniform elongation (Rm*eu) balance is higher than 11000 MPa %.

13. The α+β Ti-6Al-4V alloy according to claim 5, wherein the tensile strength×uniform elongation (Rm*eu) balance is higher than 11500 MPa %.

14. The α+β Ti-6Al-4V alloy according to claim 5, wherein the yield strength/tensile strength ratio (R0.2/Rm) is lower than or equal to 0.75.

15. The α+β Ti-6Al-4V alloy according to claim 5, wherein the yield strength/tensile strength ratio (R0.2/Rm) is lower than or equal to 0.72.

16. An α+β Ti-6Al-4V alloy with a microstructure comprising a percentage of quenched and not further heat treated martensite ranging from 20 to 50% and having a tensile strength×uniform elongation (Rm*eu) balance higher than 9500 MPa % and a yield strength/tensile strength ratio (R0.2/Rm) lower than 0.8.

\* \* \* \* \*